United States Patent [19]

Wolfe et al.

[11] Patent Number: 5,207,774
[45] Date of Patent: May 4, 1993

[54] VALVING FOR A CONTROLLABLE SHOCK ABSORBER

[75] Inventors: Paul T. Wolfe; Leonard J. Schwemmer; Donald R. Prindle, North East, all of Pa.; Charles B. Tidwell, Durham, N.C.

[73] Assignee: Lord Corporation, Erie, Pa.

[21] Appl. No.: 799,592

[22] Filed: Nov. 27, 1991

[51] Int. Cl.⁵ ............................................. F16K 5/10
[52] U.S. Cl. ............................ 137/625.32; 188/285; 251/129.12; 251/207
[58] Field of Search ..................... 189/282, 285, 299; 137/625.32; 251/207, 209, 129.12

[56] References Cited

U.S. PATENT DOCUMENTS

| | | | |
|---|---|---|---|
| 3,420,341 | 1/1969 | Keehn, II | 188/88 |
| 4,313,529 | 2/1982 | Kato et al. | 188/299 |
| 4,463,839 | 8/1984 | Ashiba | 188/299 |
| 4,520,908 | 6/1985 | Carpenter | 188/319 |
| 4,645,042 | 12/1984 | Inoue et al. | 188/319 |
| 4,702,123 | 10/1987 | Hirao et al. | 74/526 |
| 4,747,474 | 5/1988 | Kimura et al. | 188/299 |
| 4,756,549 | 7/1988 | Kurosawa et al. | 280/707 |
| 4,776,437 | 10/1988 | Ishibashi et al. | 188/299 |
| 4,800,995 | 1/1989 | Bernhardt et al. | 188/319 |
| 4,838,392 | 6/1989 | Miller et al. | 188/277 |
| 4,875,560 | 10/1989 | Imaizumo | 188/319 |
| 5,005,677 | 4/1991 | Bucholtz et al. | 188/299 |
| 5,080,392 | 1/1992 | Bazergui | 280/707 |

Primary Examiner—Stephen M. Hepperle
Attorney, Agent, or Firm—Randall S. Wayland; Richard K. Thomson

[57] ABSTRACT

A controllable shock absorber of the externally actuated type with greatly decreased valve response time. The shock absorber assembly utilizes valve rotation stops on the rotary valve for limiting the rotational motion of the valve. The valve is attached to a bendingly flexible control rod which is supported by a sealing and support assembly located down inside the piston rod, thus allowing easy assembly of the rotational motor by way of a bendingly alignable self-locating feature. The use of the one seal and support assembly further reduces the rotational forces needed to allow faster actuation of the valve. The valve actuation torque requirements have been further decreased by reducing the viscous drag on the valve body and reducing the inertia of the rotational valve assembly by hollowing out the valve. Performance robbing, side loading on the valve is minimized by using a at least two preferably symmetrical ports. Further reductions in friction are accomplished by using pressure-equalizing grooves on the valve body to reduce hydrodynamic axial loading on the valve body.

10 Claims, 5 Drawing Sheets

VALVING FOR A CONTROLLABLE SHOCK ABSORBER

FIELD OF THE INVENTION

The present invention relates to the area of adaptive and semi-active shock absorbers for reducing the energy transmitted between two bodies. Specifically, the invention relates to a controllable valve assembly for adaptive and semi-active shock absorbers.

BACKGROUND OF THE INVENTION

Valve assemblies for adaptive and semi-active shock absorbers are comprised of a valve which is either slowly or speedily actuated. The valve varies the flow of fluid between the variable volume chambers of the shock absorber, thus accomplishing a fluid restriction to increase or decrease the damping coefficient, i.e., the damping level of the shock absorber. The valve assembly which is located within the shock body, can be actuated in any one of several manners. The first comprises actuating the valve by a motor or rotating means which is outside the shock body. This method usually is accomplished by mounting a motor atop the piston rod. The second encompasses integrating the motor or rotating means into the shock body. For example, the commonly assigned U.S. Pat. No. 4,838,392 to Miller et al., describes a semi-active shock absorber with an internal voice coil type valve.

In many current production systems, the motor is added atop the shock absorber as was first mentioned. Specifically, the stationary part of the motor, such as a stepper motor, is attached to the piston rod and the moving portion, or output shaft, is connected to a control rod. This control rod is then connected to a rotary valve. The control rod and valve which comprise the valve assembly are then actuated rotationally by actuation of the rotating means, such as a stepper motor or gear motor. A motor assembly of this type is described in U.S. Pat. No. 4,747,474 to Kimura et al.

Adaptive systems are slow acting systems which have valves that are typically actuated from outside the shock body. Adaptive systems only require valve response times that are actuated on the order of seconds (approximately 50 milliseconds or more). Semi-active systems require faster response times. Typically, the valve assembly must be actuated in milliseconds (approximately 50 milliseconds or less). This requires a valve assembly which has very low inertia and where the parasitic frictional and viscous forces acting on the valve assembly have been minimized. In this way, extremely fast valve response time can be obtained, and the motor power requirements can be minimized.

SUMMARY OF THE INVENTION

Therefore it is a primary objective to provide a fast-acting valve assembly for a semi-active shock absorber.

Another objective is to provide a valve assembly for use on adaptive and semi-active shock absorbers which has reduced actuation power requirements.

Another objective is to provide a means of diagnosing when the valve within the shock absorber is functioning, by placing rotation limiting means on the valve.

Another objective is to provide a shock absorber assembly by which the motor is easily assembled onto the shock absorber assembly.

The abovementioned and further objects, features and advantages of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE INVENTION

Figure 1:
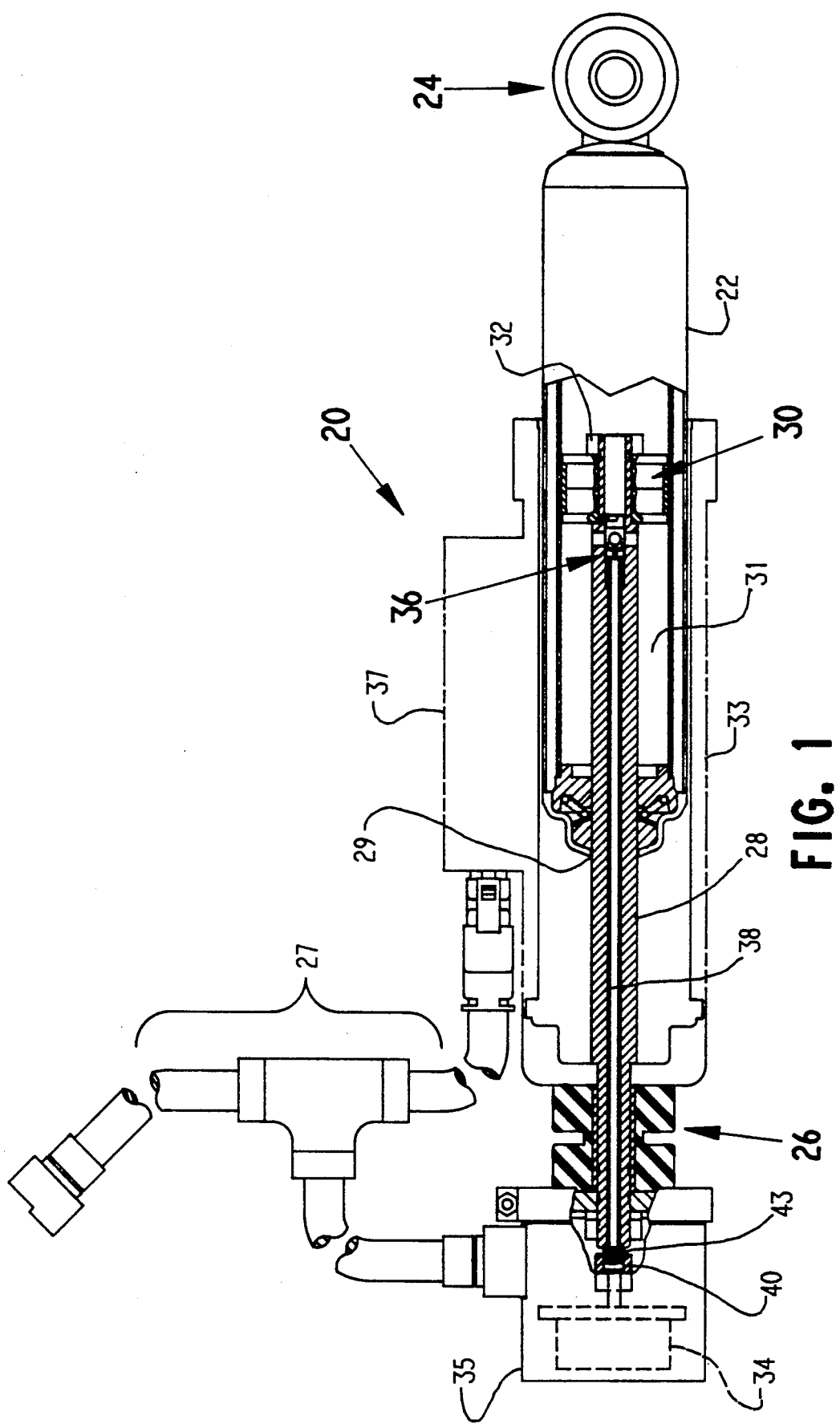
FIG. 1 is a partially sectioned side view of an embodiment of a controllable shock absorber assembly.

As best shown in FIG. 1, the controllable shock absorber assembly 20, which contains the improved fast acting valve assembly 36, is comprised of a cylindrical shock body 22, a first attachment means 24, such as a resilient bushing for attaching to a first component (not shown). A second attachment means 26, such as the split resilient bushing shown is for attaching to a second component (not shown). A piston rod 28 whose shaft is preferably cylindrical is attached to a piston assembly 30 that is telescopically moveable within the shock body 22. The piston assembly 30 is attached to the piston rod 28 by attachment means 32, such as the threaded nut shown. The piston rod 28 is slidably and sealingly engaged with the aperture 29 formed on the end of the shock body 22, for allowing the piston rod 28 to move relative to the shock body 22, and for retaining the fluid 31 within the shock body 22. Upon extension and compression of the shock absorber assembly 20, the shock body 22 will plunge into and out of the dust cover 33 (outline shown only) in a telescoping fashion.

Atop the piston rod 28 is attached a rotating means 34 (ghosted outline) such as a stepper motor for rotating the valve assembly 36. Also shown is a housing 35 for sheltering the rotating means 34 from stone strikes and corrosion. The stationary part of the rotating means 34 can either be attached to the piston rod 28 or to the housing 35. An electronic controller 37 is attached to the side of the dust cover 33 for providing the appropriate signal to actuate the rotating means 34 in response to sensed inputs. Additionally, a splined coupling 40 connects the rotating means 34 to the control rod 38 and thus allows for a rotational connection to the valve assembly 36. Further, wiring harness 27 electrically interconnects the rotating means 34, and the controller 37 with the power supply (not shown). Together, these elements make up the environment, in which the improved valve assembly 36 functions. This improved valve assembly 36 has applicability on any controllable shock absorber such as adaptive, and has particular utility on very fast acting shock absorbers, such as the semi-active variety.

Figure 2:
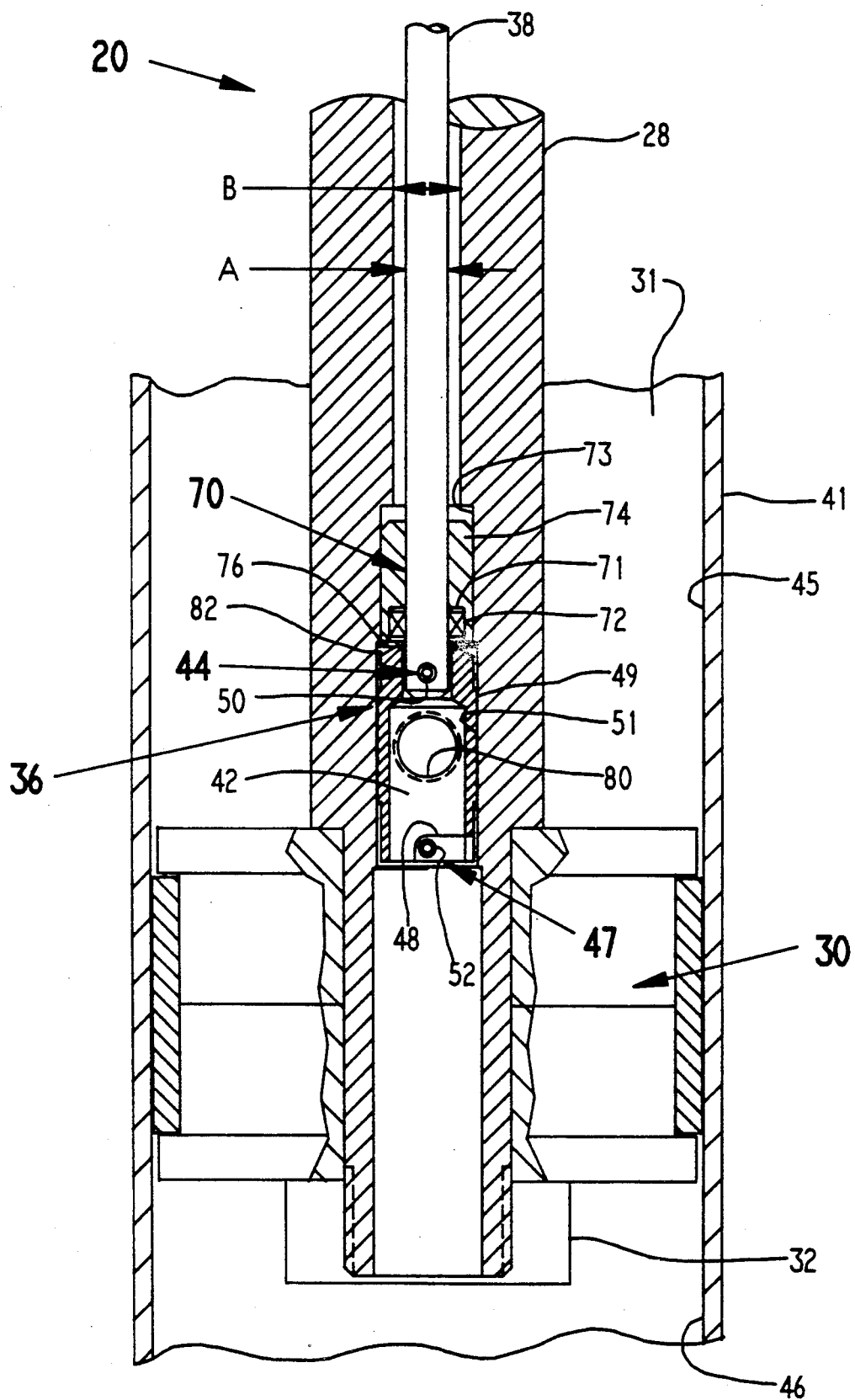
FIG. 2 is an enlarged partially sectioned front view of the valve assembly.

Now referring to FIG. 2, is shown a partial cutaway side view of the shock absorber assembly 20 with the valve assembly shown in the full open position. In this illustration, either a twintube or a monotube shock absorber construction could utilize the improved valve assembly 36. The shock absorber assembly 20 is comprised of a tubular wall 41 which slidably and telescopically receives a piston assembly 30. The piston rod 28 is attached to the piston assembly 30 by attachment means 32, such as a threaded nut. The piston assembly 30 can be of any construction, and typically has a series of spring-loaded valves (not shown) for supplying some controlled leakage through the piston assembly 30. Flow through this piston assembly 30 defines the primary fluid flow path. The valve assembly 36 provides a bypass mechanism, such that the flow of fluid 31 from the first fluid chamber 45 to the second fluid chamber 46 can be controlled. In essence, the flow of fluid 31 is diverted from the primary flow path, i.e., through the piston assembly 30, and rerouted through the valve assembly 36. In this way, full damping is provided when the flow is through the primary flow path, i.e., the piston assembly 30, and the damping level can be decreased by opening the valve assembly 36. In this way, any portion of the fluid 31 flow can bypass the piston assembly 30 and flow through the valve assembly 36.

The valve assembly 36 is comprised of a control rod 38, a valve body 42 for controlling the bypass of fluid 31, a pivoting means 44 for allowing pivoting between the valve body and the control rod 38, rotation limiting means 47 for limiting rotation of the valve body 42, a seal and support assembly 70 for sealing the control rod 38 and supporting the valve body 42, and a thrust washer 76 for reacting the axial hydrodynamic thrust loads on the valve assembly 36. The control rod 38 which can be solid or hollow, attaches to the rotating means 34 (FIG. 1) by means of a splined coupling 40 (FIG. 1). The coupling 40 has internal splines which mesh with the splines located on a splined member 43 (FIG. 1) which is attached to the end of the control rod 38. The splines are parallel to the axis of the control rod 38 such that when the splined member 43 and the coupling 40 mesh, relative rotation between them is restrained, and axial movement is allowed. The coupling 40 is attached to the output shaft of the rotating means 34.

The control rod 38, which is long, slender and bendingly flexible, is connected by the pivoting means 44 to the valve body 42 for allowing pivoting between them about one axis. The control rod 38 in this embodiment, is attached to the valve body 42 which is located within the piston rod 28 by the pivoting means 44 which includes a hole formed radially through the valve body 42 and a hole formed radially through the control rod 38 near its end. The holes in these items are lined up and a drive pin 50 is driven through them. This allows the rod 38 to rotate about the axis of the pin 50. The diameter of bore 51 formed in the valve body 42 is enlarged slightly over the diameter of the control rod 38 (approximately 0.05 inch) to allow the slight amount of pivoting to occur. This pivoting reduces the binding of the valve assembly 36 and helps for free rotation.

To aid in installation of the rotating means 34 to the valve the assembly 36, the hollow diameter B (approximately 0.250 inch) formed therein the piston rod 28 is significantly larger than the diameter A (approximately 0.150 inch) of control rod 38. The top end of the control rod 38 near the splined member 43 is not supported radially by any top support bushing; thus, the long (approximately 15 inch) bendingly flexible control rod 38 can float within the confines of the hollow diameter B. By eliminating the top support bushing and allowing the bendingly flexible control rod to follow the inherent wobble of the rotary means, the rotational concentricity requirements can be more liberal, and it also eliminates the need for a universal joint between the control rod 38 and the rotating means 34. Universal joints were required by the prior art because of severe binding that occurred between the motor and the top bushing support. Since all motors have wobble in the output shaft upon rotation, the elimination of the top support bushing allows the bendingly flexible shaft to float about its means position. This freedom to self center, or follow the wobble, has a five fold benefit. Firstly, the support bushing is eliminated. Secondly, the expensive universal joint is eliminated. Thirdly, the friction acting on the valve assembly 36 is reduced. Fourthly, blind assembly of the rotating means 34 can now be performed. Finally, lower cost motors can be used, due to more liberal concentricity requirements.

Figure 3:
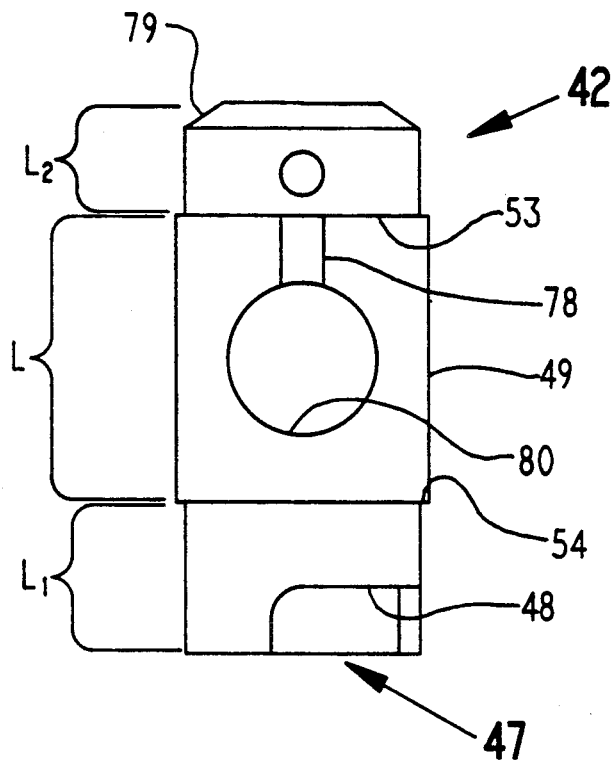
FIG. 3 is an enlarged front view of the valve body.

The valve body 42 is comprised of many features which provide for decreased actuation time for the valve assembly 36. As best seen in FIG. 3, the valve body 42 has a hollow tubular shape, with an outer cylindrical periphery 49 for engaging rotationally with the bore 51 (FIG. 2) within the piston rod 28. This engagement has a very tight tolerance fit to allow precision sealing around the valve body 42 and yet still allow ease of rotation. The wall thickness of the valve body 42 is kept as thin as practicable for reducing the inertia of the valve body 42. Located on the valve body 42 is a rotation-limiting means 47 for limiting the degree of rotation of the valve 42. In this case, a groove 48 interacts with a guide pin 52 (FIG. 2) to restrict rotational motion to approximately 90 degrees. On the valve body 42, shoulders 53 and 54 are added to decrease the effective engagement length of the valve body 42 with the bore 51. This allows the precision fit to be machined only on the length L of the valve body 42, allowing for a less expensive part. Additionally, the gap between the valve body 42 and the bore 51 is approximately 0.001 inch along length L. This small gap produces high viscous drag on the valve assembly 36, thus it is advantageous to reduce the effective length L of the valve body 42, thus decreasing the shear area. As mentioned, this is a function of the shoulders 53 and 54. In the areas LI and L2, the gap is significantly increased, so as to reduce the viscous shear forces.

To further reduce the viscous shear forces, the contact area of the valve body 42 which contacts the thrust washer 76 (FIG. 2) is reduced. This is accomplished by adding a taper 79 to the top axial end of the valve body 42, and makes the valve easier to actuate. The hydrodynamic axial forces acting on the valve body 42 are reduced by addition of pressure-equalizing means 78 to the valve body 42. As shown in FIG. 3, a relief groove 77 is added to the side of the valve body 42 which interconnects each valve port 80 to the fluid space 82 (FIG. 2) above the valve body 42. The dynamic pressure will then be equalized between the top portion and inside of the valve body 42. This will reduce the force pressing the valve body 42 against the thrust washer 76. This reduces the friction between the washer 76 and the valve body 42, thus making the valve assembly 36 easier to actuate. Any pressure-equalizing means 78 for equalizing the pressure between the fluid space 82 and the inside of the valve body 42 or the second chamber 46 can be used, such as hole(s) extending from the inside of the valve body 42 to the fluid space 82, or slots on the valve body 42, fluidically interconnecting the fluid space 82 and the second chamber 46 (FIG. 2).

Again referring to FIG. 2, a seal-and-support assembly 70 is positioned above the valve body 42 as shown in FIG. 2. The seal-and-support assembly 70 is comprised of a seal 72, a support bearing 74, and a thrust washer 76. The seal 72 is a spring loaded annular-lip-type seal which is accepted in a recess 71 formed on the support bearing 74. The seal 72 seals the flow of fluid 31 from escaping between the control rod 38 and the support bearing 74. The support bearing 74 is press fit into a cavity 73 formed within the piston rod 28, for sealing the flow path around the support bearing 74. Other means for sealing the support bearing 74 are equally acceptable, such as an o-ring situated in a groove on the periphery of the support bearing 74. As shown, the thrust washer 76 reacts the hydrodynamic axial loads acting on the valve body 42 into the piston rod 28. Thus, the seal 72 and bearing support 74 do not encounter axial loads.

Figure 4:
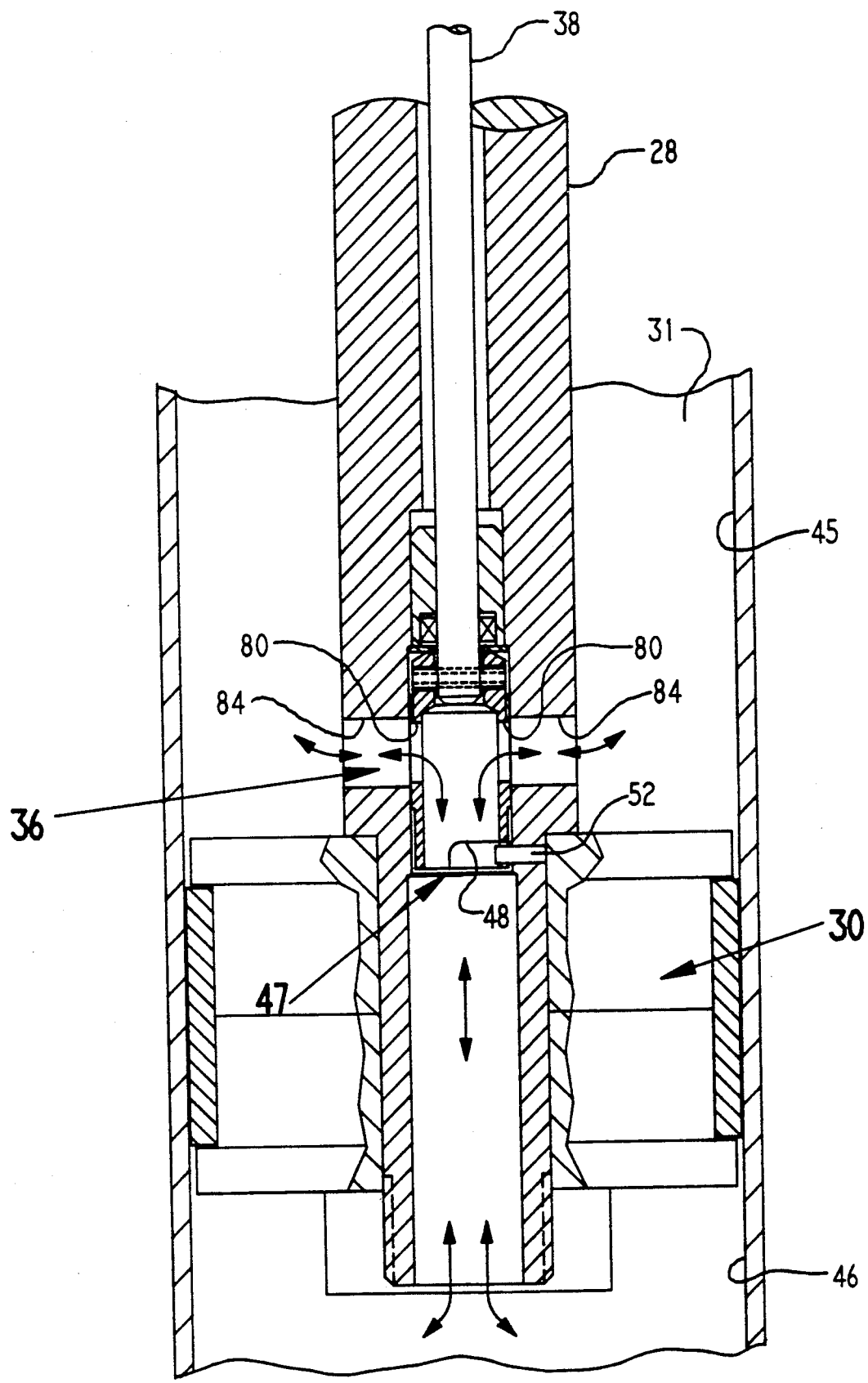
FIG. 4 is an enlarged partially sectioned side view of the valve assembly.

Now referring to FIG. 4, the valve assembly 36 is shown in the full open position. The piston rod 28 is comprised of a plurality of symmetrical rod ports 84 which are disposed radially about the periphery of the rod 28. The flow path is indicated by the arrows when the valve assembly 36 is open. The flow bypasses the piston assembly 30 and flows between the first fluid chamber 45 and the second fluid chamber 46 when the valve ports 80 and the rod ports 84 are fully aligned. Any partial rotation of the valve assembly 36 from this fully open position will begin to restrict the flow of fluid 31. This embodiment shows two ports 80 and 84 which have a round shape and are substantially radially extending. However, any number of symmetrical ports will result in a balanced valve body 42 and reduce wear inducing side loading. In addition, the preferably symmetrical ports 80 and 84 shape could be round, square, triangular or oblong. They could also be of different size. Preferably, the valve ports 80 are smaller than the rod ports 84. Shown in this view is the interaction of the guide pin 52 and the groove 48 formed on the valve body 42. The interaction will limit the rotation of the valve assembly 36 such that the groove 48 contacts the guide pin 52 when the valve is either fully closed or fully open. Although, it may be desirable to have the valve assembly 36 partially open at the stops. The guide pin 52 used in the rotation-limiting means 47, also can serve to retain the valve assembly 36 within the piston rod 28. This rotation limitation allows the valve assembly 36 to be diagnosed, to make sure it is functioning properly. The prior art devices could only diagnose what the motor or rotating means 34 (FIG. 1) were doing, and only speculate about the valve body 42 rotation. The stops were built into the top of the rod 38, or within the rotating means 34 for the prior art devices. The rotation-limiting means 47 could take on many other forms other than the pin and groove arrangement. All that is required is that the valve assembly 36 be limited to some predetermined rotational angle, such as can be accomplished by any two contacting surfaces on the valve body 42 and on some other member.

Figure 5:
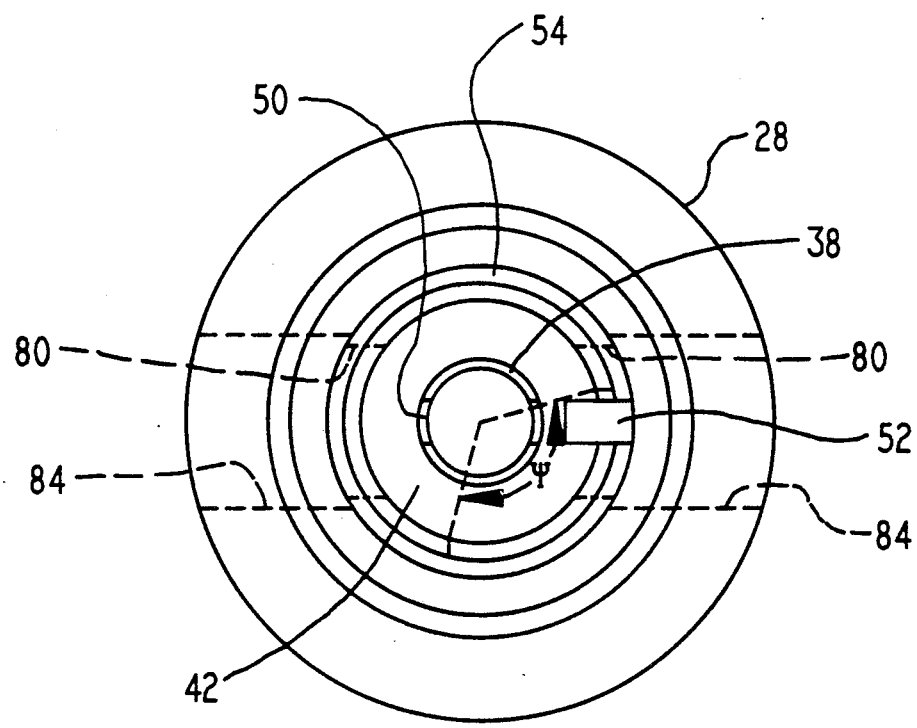
FIG. 5 is an enlarged bottom view of the valve assembly.

FIG. 5 is a bottom sectional view looking upward at the piston rod 28 and valve assembly 36, with the piston assembly 30 removed, for purposes of clarity. The rod 28 and valve body 42 in this embodiment have two ports each, the rod ports 84 and the valve ports 80, which are shown aligned. The guide pin 52 is press fit into the rod 28, such that it contacts the groove 48 at the ends of the rotational excursions and allows an angle of rotation $\Psi$ of about 90 degrees. Also shown are the shoulder 54 on the valve body 42, the end of control rod 38, and a portion of the drive pin 50.

Figure 6:
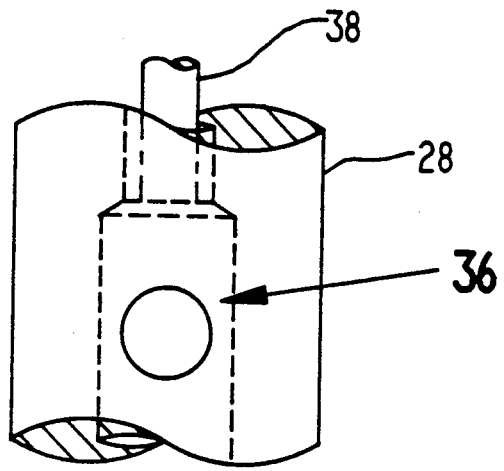
FIG. 6 is a side view of the valve assembly in the open position.
Figure 7:
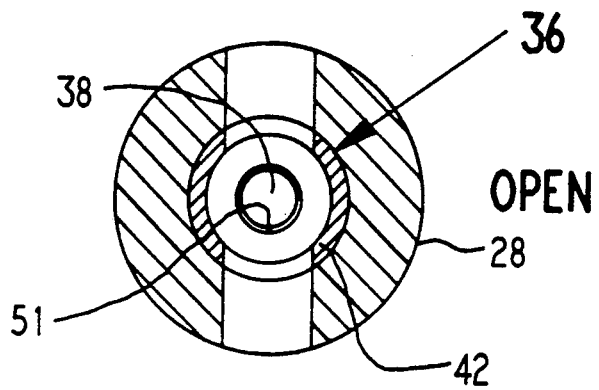
FIG. 7 is a bottom sectioned view of the valve assembly in the open position.
Figure 8:
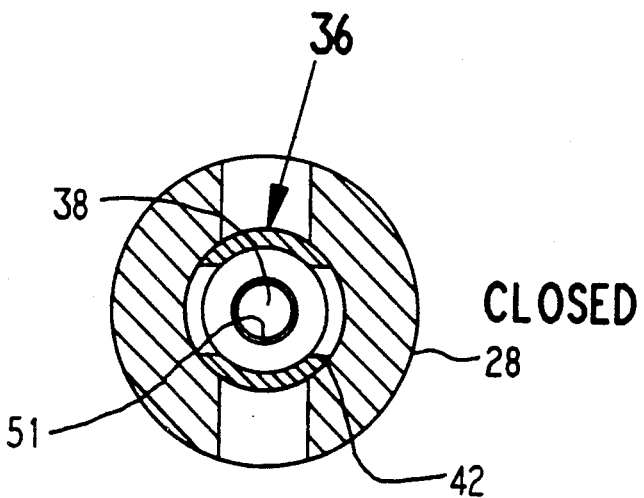
FIG. 8 is a bottom sectioned view of the valve assembly in the closed position.

FIGS. 6, 7 and 8 show various views of the piston rod 28 and valve assembly 36. In each view, the control rod 38 is shown. In FIGS. 7 and 8 the annular gap between the control rod 38 and the bore 51 formed in the valve body 42 is shown. As previously mentioned, this gap allows limited pivoting of the valve body 42 relative to the control rod 38 about one axis. The illustrations show the valve assembly 36 in the fully open and fully closed positions.

While the preferred embodiment of the present invention has been described in detail, various modifications, alterations, changes and adaptations of the invention to other types of shock absorbers similar to the aforementioned may be made without departing from the spirit and scope of the present invention defined in the appended claims. For instance, in many cases, a thrust washer may not be required on the shock absorber, or the support bearing could be built into the piston rod, yet the improved valve assembly could still be utilized. Also, the valve assembly could be only partially housed within the piston rod, and the valve body could be housed within the piston. The pivoting means could also be located above the seal and support assembly, providing an alternate self-centering feature. It is intended that all such modifications, alterations and changes be considered part of the present invention.

What is claimed is:

1. A rotary valve assembly which is actuated by a rotated means on a variable shock absorber, comprising:
    a) a piston rod having a hollow portion, a first end for attachment to a piston and a second end spaced apart from said first end for interconnecting to a component:
    b) a rotary valve means which is hollow inside, has at least one open end, at least two ports formed therein, and has rotation limiting means formed thereon for restricting the rotation of said rotary valve means within limits, said means for restricting rotation limiting movement to an angle of about 90°; and
    c) a control rod disposed within said hollow portion in said piston rod, said control rod being substantially smaller in diameter than said hollow portion in said piston rod, being pivotally attached to said rotary valve means, and having a support bearing located sufficiently far away from said second end of said piston rod, such that said control rod can bendingly align with the rotating means, said control rod having one end connected to said rotary valve means, and the other end connected to an output shaft of the rotating means.

2. A valve assembly in accordance with claim 1 wherein said rotary valve means further includes a tapered portion formed on an upper surface of said rotary valve means to provide a clearance space between a contact member and said rotary valve means, pressure-equalizing means for balancing pressures between said clearance space above, and said hollow inside, of said rotary valve means, whereby axial hydrodynamic loading of said rotary valve means is minimized in order to facilitate rotating of said rotary valve means.

3. A valve assembly in accordance with claim 2 wherein said control rod is connected to a said rotating means by a coupling permitting relative axial movement.

4. A valve assembly in accordance with claim 1 wherein said rotary valve means is pivotally attached to said control rod.

5. A rotary valve assembly which is actuated by a rotating means on a variable shock absorber, comprising:
   a) a piston rod having a hollow portion, a first end for attachment to a piston and a second end spaced apart from said first end for interconnecting to a component;
   b) a rotary valve means; and
   c) a control rod disposed within said hollow portion in said piston rod, said control rod being substantially smaller in diameter than said hollow portion in said piston rod, being pivotally attached to said rotary valve means, and having a support bearing located sufficiently far away from said second end of said piston rod, such that said control rod can bendingly align with the rotating means, said control rod having one end connected to said rotary valve means, and the other end connected to an output shaft of the rotating means.

6. A valve assembly in accordance with claim 5 wherein said rotary valve means is hollow inside with at least one open end, has at least two ports, said rotary valve means being disposed within said piston rod, said piston rod having at least two ports formed therein for variably cooperating with said at least two ports in said rotary valve means, in a manner to restrict fluid flow through said valve assembly.

7. A valve assembly in accordance with claim 6 wherein said rotary valve means further includes a tapered portion formed on an upper surface of said rotary valve means to provide a clearance space between a contact member and said rotary valve means, pressure-equalizing means for balancing pressures between said clearance space above and said hollow inside of said rotary valve means, whereby axial hydrodynamic loading of said rotary valve means is minimized in order to facilitate rotation of said rotary valve means.

8. A valve assembly in accordance with claim 6 wherein said control rod is connected to a said rotating means by a coupling permitting relative axial movement.

9. A rotary valve assembly which is actuated by a rotating means on a variable shock absorber, comprising:
   a) a piston rod having a hollow portion, a first end for attachment to a piston and a second end spaced apart from said first end for interconnecting to a component;
   b) a rotary valve means which is hollow inside, has at least one open end, at least two ports formed therein, and includes a tapered portion formed on an upper surface of said rotary valve means to provide a clearance space between a contact member and said rotary valve means, pressure-equalization means for balancing pressures between said clearance space above, and said hollow space inside of said rotary valve means, whereby axial hydrodynamic loading of said rotary valve means is minimized in order to facilitate rotation of said rotary valve means; and
   c) a control rod disposed within said hollow portion in said piston rod, said control rod having one end pivotally connected to said rotary valve means, and the other end connected to an output shaft of the rotating means.

10. A valve assembly in accordance with claim 9 wherein said at least two ports have shapes which are selected from the group consisting of square, triangular, round, rectangular and oblong.

* * * * *